Oct. 5, 1965

O. E. JAKEL 3,210,581

ELECTRIC MOTOR BEARING LUBRICATION

Filed Jan. 7, 1963

INVENTOR.
OTTO E. JAKEL

BY *Alfred W. Petchaft*

ATTORNEY

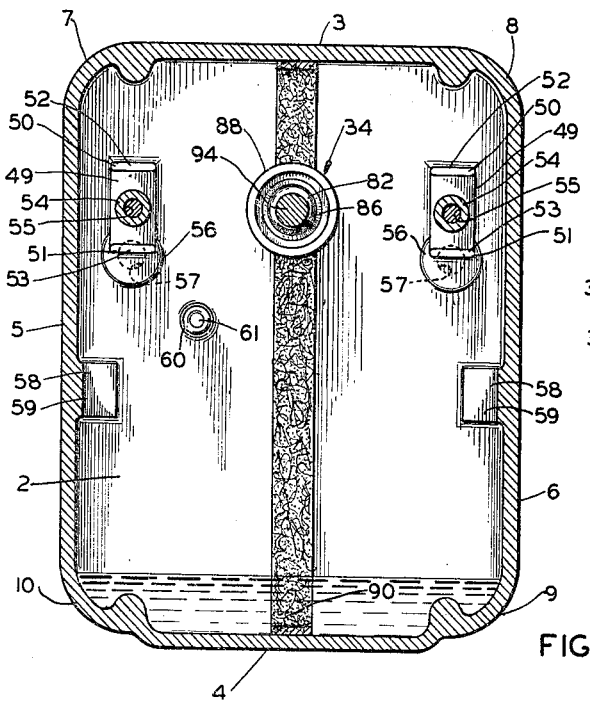

United States Patent Office 3,210,581
Patented Oct. 5, 1965

3,210,581
ELECTRIC MOTOR BEARING LUBRICATION
Otto E. Jakel, Highland, Ill., assignor to Jakel Mfg. Co.,
Highland, Ill., a corporation of Illinois
Filed Jan. 7, 1963, Ser. No. 249,696
7 Claims. (Cl. 310—90)

This invention relates in general to certain new and useful improvements in electric motors and, more particularly, to a permanently lubricated type motor.

The maintenance of lubrication at the shaft-bearings of electric motors is, of course, directly related to the length of service and efficiency of such motors. In large heavy-duty motors very elaborate means are frequently provided to circulate lubricants through the shaft-bearings. In small motors, it is commonplace to provide externally accessible oil-holes at the shaft-bearings and rely on the user to lubricate the bearings at regular intervals. In recent years, however, fully sealed motors have been developed for an increasing number of applications and such motors employ various means for maintaining a film of oil in the shaft-bearings, but thus far such expedients have not been particularly successful because the oil seems to be forced out of bearings along the shaft. Since sealed motors are ordinarily used where it is desirable to avoid contamination of the space directly outside the motor, the leakage of oil is highly undesirable not only because the oil supply is thereby exhausted prematurely, but also because the oil droplets or oil fumes will tend to contaminate or soil adjacent surfaces of the device in which the sealed motor is a component.

It is, therefore, the primary object of the present invention to provide a sealed electric motor which is lubricated in such a manner that it is capable of continuous operation for long periods of time without maintenance or servicing, but, nevertheless, will not leak oil or discharge oily spray into the ambient atmosphere.

It is another object of the present invention to provide an electric motor of the type stated which is mounted within a sealed outer casing containing a substantially permanent supply of lubricating oil in such a manner that oil will not be periodically forced away from the shaft-bearings.

It is an additional object of the present invention to provide an electric motor of the type stated which is highly efficient in its operation and suffers minimal power loss from friction in the shaft-bearings.

It is also an object of the present invention to provide an electric motor of the type stated which is sturdy in its construction and economical in its operation.

With the above and other objects in view, my invention resides in the novel features of form, construction, arrangement, and combination of parts presently described and pointed out in the claims.

In the accompanying drawings (two sheets):

Figure 2:
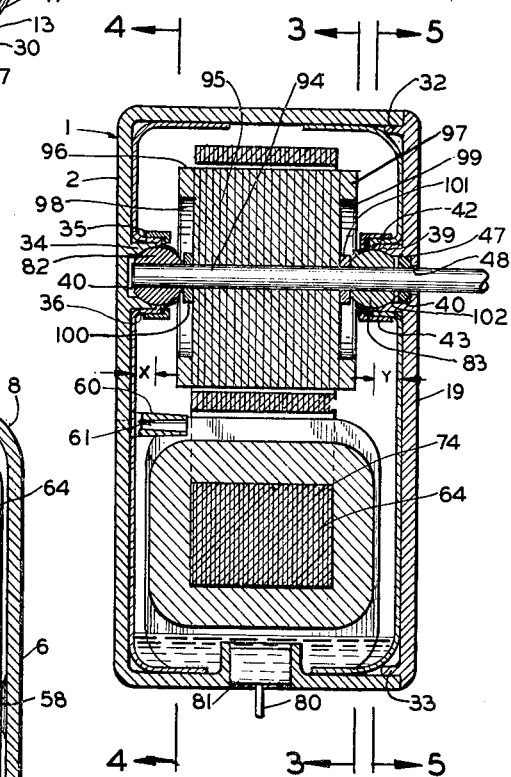
FIG. 2 is a vertical sectional view taken along line 2—2 of FIG. 1.
Figure 3:
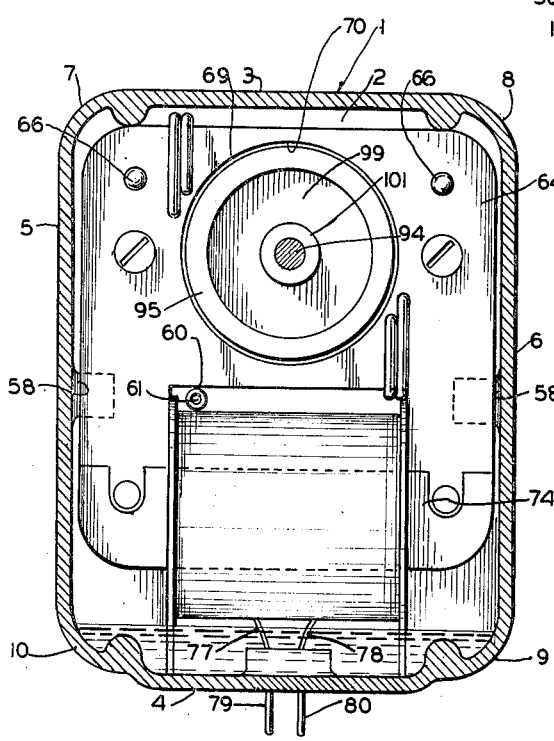

FIGS. 3, 4, and 5 are transverse sectional views taken along lines 3—3, 4—4, and 5—5, respectively, of FIG. 2; and FIGS. 6 and 7 are enlarged exploded perspective views of the rear and front bearing assemblies embodied in the present invention.

Referring now in more detail and by reference characters to the drawings, which illustrate a preferred embodiment of the present invention, A designates a sealed electric motor of the single-phase shaded pole type comprising a rectilinear box-like outer housing 1, which is preferably die-cast from aluminum or other similar light-weight metal and integrally includes a base wall 2 perimetrally joined by four side walls 3, 4, 5, 6, which merge across rounded corners which are thickened to provide corner-fillets 7, 8, 9, 10, respectively provided at their outer ends with axially projecting fastener lugs 11, 12, 13, 14, having concentric recesses 15, 16, 17, 18.

Disposed in closurewise position across the outer margins of the side walls 3, 4, 5, 6, is a substantially rectangular cover-plate 19 provided at its four corners with apertures 20, 21, 22, 23, which respectively open outwardly into somewhat enlarged quarter-circle recesses 24, 25, 26, 27. The apertures 20, 21, 22, 23, are aligned respectively with, and fit around, the lugs 11, 12, 13, 14, which, in turn, initially project into, and above the bottom surfaces of, the recesses 24, 25, 26, 27, so that when the motor A is finally assembled, such projecting portions can be upset or "staked down" in the provision of rivet-like button-heads 28, 29, 30, 31, by which the cover-plate 19 is secured tightly in place. In addition, the cover-plate 19 is integrally provided on its interior face with an inwardly projecting continuous flange 32 which fits snugly around the interior faces of the side walls 3, 4, 5, 6, and is sealed thereto by a continuous line 33 of a suitable adhesive or potting compound, such as an epoxy-resin cement.

On its interior face, the base wall 2 is integrally provided with an upstanding bearing-boss 34 having oppositely presented parallel flat external faces 35, 36, connected by arcuate faces 37, 38, which conform in shape to a cylindrical surface. Internally, the bearing-boss 34 is provided with a socket 39 which conforms in shape to a truncated hemisphere and bottoms out in a shallow concentric cylindrical recess 40. The bearing-boss 34 is centered upon the longitudinal centerline of the housing 1 in coaxial alignment with a matching bearing-boss 41 formed on the interior face of the cover-plate 19 and also having oppositely presented parallel flat external faces 42, 43, connected by arcuate faces 44, 45, which conform in shape to a cylindrical surface. Internally, the bearing-boss 41 is provided with a socket 46 which conforms in shape to a truncated hemisphere and bottoms out in a shallow concentric cylindrical recess 47 having a coaxial shaft-clearance aperture 48.

On its interior face, the base wall 2 is also integrally provided with two upstanding motor-mounting bosses 49 which are identical in shape and are located equidistantly on opposite sides of the longitudinal centerline of the housing 1 and along the transverse centerline of the bearing-boss 34, all as best seen in FIG. 4. The motor-mounting bosses 49 each have upstanding laterally spaced shoulders 50, 51, having coplanar abutment faces 52, 53, respectively. Formed integrally upon the motor-mounting bosses 49 midway between the shoulders 50, 51, are upwardly projecting pillars 54 having a coaxial internally tapped bolt-hole 55. Also formed integrally with the motor-mounting bosses 49 are boss-extensions 56, which merely afford sufficient metal to enclose exteriorly opening pilot-holes 57 adapted for receiving conventional self-tapping screws (not shown) by which the motor A can be conveniently mounted upon an appliance wall or other device in which it is a component. The base wall 2 is further integrally provided with auxiliary support-bosses 58 located in outwardly spaced or so-called "outboard" relation to the motor-mounting bosses 49 and having flat abutment faces 59 which are mutually coplanar with the abutment faces 52, 53. Finally, the base wall 2 is integrally provided with an upstanding tubular vent-neck 60 having a coaxial small-diameter duct or passage 61 which opens at one end into the interior of the housing 1 and at its other end upon the exterior face of the base wall 2, all as best seen in FIG. 2 and for purposes presently more fully appearing.

The cover-plate 19 is also integrally provided with bosses 62 which are preferably located more or less in axial alignment with the boss-extensions 56, and are provided with externally opening pilot-holes 63 similarly adapted for receiving conventional self-tapping mounting screws (not shown). It will be evident from FIGS. 1 and 2 that the outwardly presented faces of the base wall 2 and cover-plate 19 are flush surfaces, thereby materially simplifying the design of mounting arrangements.

Disposed within the housing 1 and being sized for retentive engagement with the interior lateral surfaces of the housing 1 is a laminated stator 64 which assumes a configuration, as shown in FIG. 3, and is provided with a transverse element 69, which is semi-circularly punched out to form a rotor-socket 70. The stator 64 also includes a core-lamination 74 which supports a stator winding 76 having lead-wires 77, 78, soldered to input leads 79, 80, which form a part of, and extend through, an hermetic connector fitting 81 set into the side wall 4 of the housing 1.

Rotatably mounted within the bearing-sockets 39, 46, are impregnated sintered bronze bearings 82, 83, having the shape of truncated spheres and being provided with axial shaft-holes 84, 85. The bearings 82, 83, are held in self-aligning position within the sockets 39, 46, by means of dished spring washers 86, 87, and annularly-flanged cylindrical cap-like retainer rings 88, 89, which fit snugly upon the bearing-bosses 34, 41, and not only hold the washers 86, 87, in place, but also serve to retain felt wick-members 90, 91, which run up through the spaces between the rings 88, 89, and the flat surfaces 35, 36, and 42, 43, of the bosses 34, 41, respectively. At their retained ends, the wick-members 90, 91, are integrally provided with rings 92, 93, that feed oil to the bearings 82, 83. At their other ends, the wick-members extend to the lower portion of the housing 1, as shown in FIG. 2 (i.e., along the wall 5), so as to dip down into a body of lubricating oil which is located at this region of the interior of the housing 1 when the motor is mounted in the position shown in FIG. 1 and is of such volume or amount as to stand at the level indicated. This level of oil is such that the volume of oil required to create such level will be sufficient to lubricate the shaft-bearings 82, 83, for the full life term for which the motor is designed. Actual experiments in connection with the present invention have indicated a life term of five to ten years can easily and reliably be attained with motors constructed in accordance with the present invention. There is, however, one important and significant factor which must be observed. The vertical height of the connector fitting 81 above the interior face of the housing side wall 4 is greater than the height or level of the body of lubricating oil which lies on this side wall 4 when the motor is mounted in the position shown in FIGS. 1 and 2. It has been found in connection with the present invention that it is sufficient to maintain adequate and continuous lubrication over very long life terms to employ a volume of oil sufficient to maintain a level having a depth in the range of .1875″ to .25″, although this depth is not particularly critical. The important point is that the interior height of the connector fitting 81 should be great enough so as to stand well above this oil level to overcome the possibility of unauthorized leakage of oil to the exterior of the housing 1. As a matter of actual fact, when the connector fitting 81 is tightly fitted into the side wall 4 and sealed in place by a suitable epoxy-resin adhesive or sealing material, the possibility of leakage is minimal, but, by designating the connector fitting 81 in the manner just suggested, it is possible to achieve an even greater standard of reliability so far as leakage at this point is concerned.

Figure 1:
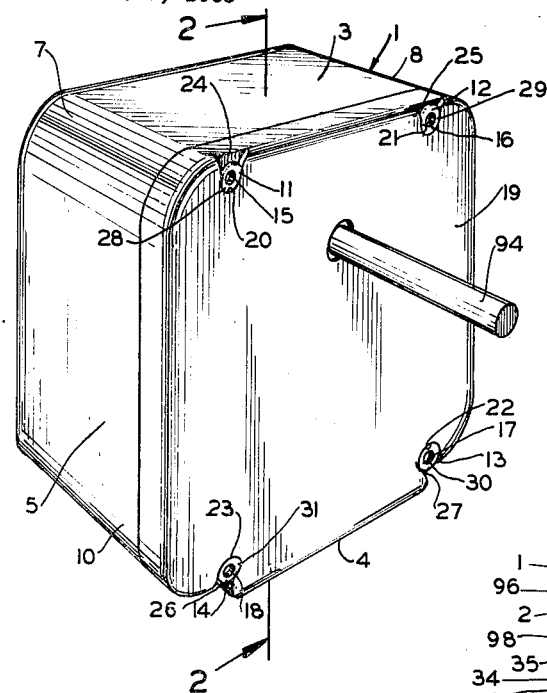
FIG. 1 is a perspective view of an electric motor constructed in accordance with and embodying the present invention.

Since the motor A may be mounted in many other different positions of orientation than that which, for purposes of convenient illustration, is shown in FIGS. 1 and 2, the same considerations which have been outlined above in connection with the internal height of the connector fitting 81 also apply to the perpendicular distance between the interior face of the base wall 2 and end face of the bearing-boss 34 as well as the perpendicular distance between the interior face of the cover-plate 19 and the end face of the bearing-boss 41. These perpendicular distances must be substantially greater than the distances $x$ and $y$, as shown in FIG. 2, which distances are, for illustrative purposes, intended to indicate the depth of the body of lubricating oil if the motor A is mounted so that the base wall 2 is horizontal and in downwardly presented position or if, on the other hand, the motor A is mounted in such position that the cover-plate 19 is horizontal and in downwardly presented position. Finally, the interior open end of the duct or passage 61 of the vent-neck 60 is of substantially greater height than the height of the bearing-bosses 34, 41, and, as will be seen by reference to FIG. 3, it is located so as to project into, or at least be in alignment with, the open space within the motor laminations. By this means, the open end of the duct 61 of the vent-neck 60 is well above any oil level which might be established within the interior of the housing regardless of the position of the orientation in which the motor A may be mounted and, moreover, is substantially protected from accidental contact with any minute globules of oil that might accidentally be splashed about within the interior of the housing 1. As a matter of practical fact, the viscosity of even light-weight lubricating oils and the amount of oil required for motors constructed in accordance with the present invention is sufficient that the motor A would have to be violently shaken about and rather seriously mishandled before any of the oil would tend to splash around the interior in the form of discrete particles or globules and, therefore, be capable of leaking outwardly through the duct 61. There is, however, some possibility that oil which is fed up to the bearings 82, 83, through the capillary action of the wick-members 90, 91, will form a very minute film along the peripheral faces of the shaft 94 and, in the course of time, creep inwardly to the surfaces of the rotor 95. Since the rotor 95 spins very rapidly when the motor A is energized, any appreciable amount of oil which reaches the surfaces of the rotor 95 will be hurled outwardly therefrom due to centrifugal force and conceivably could form a minute amount of finely divided oil-spray. This oil-spray, however, will ordinarily impinge on the interior surfaces of the housing 1 or upon the surfaces of the motor laminations and ultimately flow back to the residual body of lubricating oil within the housing 1. By reason of the height of the vent-neck 60, the small diametral size of the duct 61 therein, and also, in part, by reason of the location of the vent-neck 60, it is extremely unlikely that any oil-spray or globules of oil will ever contact the internal end-area of the vent-neck 60. As a matter of experimental observation, the motor A has been run in various positions of orientation over long periods of time without the slightest degree of leakage of oil through the duct 61 of the vent-neck 60.

Journaled within, and extending axially through, the bearings 82, 83, is a rotor shaft 94 and rigidly keyed thereto is a laminated rotor 95 of the squirrel-cage type which is sized to freely rotate within the rotor-socket 71. Welded or otherwise rigidly secured to the transverse ends of the rotor 95 are end rings 96, 97, having the same diametral size as the rotor 95 and are provided with relatively large diameter outwardly opening concentric recesses 98, 99, respectively. Disposed within the recesses 98, 99, and concentrically encircling the shaft 94 are end washers 100, 101, respectively, which abut the transverse end walls of the rotor 95. The rotor shaft 94 is journaled within the bearings 82, 83 and extends outwardly through the bearing 83 and projects through a Teflon sealing ring 102 seated in the recess 47. It will be noted by reference to FIG. 2 that the diametral size of the circular aperture 48 in the cover-plate 19 is substantially larger than the outside diametral size of the shaft 94 so that there is adequate clearance between the aperture 48 and the perpendicular face of the shaft 94. In this connection, it should be noted that Teflon has been found to be most suitable as material for a seal since it possesses excellent sealing qualities for the type of oil to be used in connection with the present invention, such as, for example, siloxane polymers of the general formula $(SiR_2O)_n$, where R is a halogenated aromatic hydrocarbon compound, or an oil having a high paraffin to naphthene ratio possessing good viscosity-temperature stability resistance to undesirable oxidation.

In use, the outer end of the rotor shaft 94 may be conveniently connected to any suitable appliance and used as a drive shaft to operate such appliance. The lead-wires or conductors 77, 78, are then connected to some suitable source of alternating electrical current (not shown) for energization of the stator winding 76. This will, in turn, cause rotation of the rotor 95 and the rotor shaft 94. The housing 1 can be mounted in any desired position in a variety of appliances such as a refrigerator. As has been previously pointed out, the motor A may be mounted so that it sits in a vertical position when the rotor shaft 94 extends in a horizontal direction, or it may be mounted in such a manner that the shaft 94 will extend in a vertical direction.

Inasmuch as a solid and continuous film of lubricating oil is thus maintained between the peripheral surfaces of the shaft 94 and the interior journal surfaces of the bearings 82, 83, and, furthermore, since the motor A will exhibit a substantial temperature rise after being in operation for any appreciable length of time, the air which is entrapped within the housing 1 when the motor A is sealed ordinarily, in a conventional type of sealed motor, will build up in pressure and actually blow this lubricating film which is entrapped between the peripheral surfaces of the shaft 94 and the interior surfaces of the bearing 83 outwardly to the exterior of the housing 1. This film of oil, of course, has an appreciable surface tension which, for a short period of time, will resist the pressure build-up within a conventional type of sealed motor, but will, in due course, give way and be expelled to the exterior. This momentarily releases the pressure and the oil film will again build up from the residual supply of lubricant until the pressure again builds up and another minute quantity of oil is blown outwardly. During extended periods of operation, therefore, conventional sealed motors will actually "pump" the lubricant out to the exterior so that the supply of lubricant is gradually depleted in such conventional sealed motors and, in addition, the lubricant which is thus expelled to the exterior can, and frequently does, soil or contaminate the exterior environment in which the motor is utilized.

The sealed motor A constructed in accordance with the present invention, however, completely overcomes this undesirable loss of lubricant, since the very small-bore duct 61 of the vent-neck 60 serves continuously to relieve any tendency to create a pressure differential between the interior of the housing 1 and the ambient atmosphere. In addition, the Teflon sealing ring 102, since it is not subjected to any pressure differentials, functions efficiently to prevent any unauthorized creeping of the oil film from the interior of the bearing 83 outwardly along the shaft 94 to external areas of the motor A.

It should be understood that changes and modifications in the form, construction, arrangement, and combination of parts of the electric motors may be made and substituted for those herein shown and described without departing from the nature and principle of my invention.

Having thus described my invention, what I claim and desire to secure by letters patent is:

1. An electrical motor comprising an outer housing, a stator mounted in and entirely enclosed by said housing in spaced relation to at least some of the interior faces of the outer housing, a set of aligned bearings disposed within said housing, a rotatable shaft operatively journaled in said bearings, said shaft projecting on least one end through the housing so as to be accessible externally of the housing, a rotor mounted on and carried by said shaft and being disposed in operative relation to the stator, a supply of lubricating oil disposed within said housing, means operatively associated with said bearings for continuously conducting lubricating oil to said bearings, means interposed between the shaft and the housing where the shaft emerges from the housing to restrain oil-flow to the outside of the housing along the shaft, and means extending into the housing for venting pressure which tends to build up within the housing due to temperature-rise of the motor, said last-named means being a tubular element extending inwardly from a selected wall of the housing for a distance greater than the depth of the body of lubricating oil which will accumulate on such selected wall when the latter is in downwardly disposed horizontal position.

2. An electrical motor according to claim 1 in which the stator has a hollow space and the tubular element projects into such space.

3. An electrical motor according to claim 1 in which the bore in the tubular element is diametrically greater in size toward its exterior end.

4. An electrical motor according to claim 1 in which the means for venting pressure has a small-diameter bore communicating between the interior and exterior of the housing.

5. An electrical motor according to claim 4 in which the small-diameter bore is of capillary size.

6. An electrical motor comprising an outer housing including a top wall and a bottom wall marginally connected by side walls, a stator mounted in and entirely enclosed by said housing in spaced relation to at least some of the interior faces of the outer housing, a set of aligned bearings disposed within said housing, a rotatable shaft operatively journaled in said bearings, said shaft projecting on at least one end through the housing so as to be accessible externally of the housing, a rotor mounted on and carried by said shaft and being disposed in operative relation to the stator, a supply of lubricating oil disposed within said housing, lubrication means operatively associated with said bearings for continuously conducting lubricating oil to said bearings, said lubrication means comprising a lower pad disposed on the interior surface of the bottom wall and an upper pad retentively held against the interior surface of the top wall, the supply of lubricating oil being sufficient to saturate said upper and lower pads, means interposed between the shaft and the housing where the shaft emerges from the housing to restrain oil-flow to the outside of the housing along the shaft, means extending into the housing for venting pressure which tends to build up within the housing due to temperature-rise of the motor, said last-named means being a tubular element extending inwardly from a selected wall of the housing for a distance greater than the depth of the body of lubricating oil which will accumulate on such selected wall when the latter is in downwardly disposed horizontal position.

7. An electrical motor according to claim 6 in which the means for venting pressure has a small-diameter bore communicating between the interior and exterior of the housing.

References Cited by the Examiner
UNITED STATES PATENTS

| | | | |
|---|---|---|---|
| 2,245,433 | 6/41 | Delmonte | 310—90 |
| 2,484,166 | 10/49 | Huston | 310—90 |
| 2,606,083 | 8/52 | Kitto | 310—90 |

MILTON O. HIRSHFIELD, *Primary Examiner.*